Patented Mar. 22, 1938

2,112,217

UNITED STATES PATENT OFFICE 2,112,217

MAKING SENSITIZED ELEMENTS

Walter Dewey Baldsiefen, Raritan Township, Middlesex County, N. J., assignor to Du Pont Film Manufacturing Corporation, New York, N. Y., a corporation of Delaware No Drawing. Application July 25, 1934, Serial No. 736,970

2 Claims. (Cl. 95—7)

This invention relates to sensitized elements and more particularly to a method of preparing X-ray sensitive elements that will be unimpaired by the phosphorescence or after-glow of intensifying or fluorescent screens.

An objectionable feature attending the use of intensifying screens in radiology is that occasionally screens are found which, after having been removed from the field of X-ray excitation, continue to emit light for a considerable time, in some cases a matter of hours or days. Sensitized elements such as X-ray films remaining in contact with such phosphorescent screens continue to receive this light energy and when developed give the appearance of over-exposure. A more serious difficulty arises when a cassette containing such screens is unloaded soon after exposure and unexposed film inserted preparatory to making another radiograph. In this case the phosphorescence caused by the first exposure forms a latent image on the second film that impairs or completely vitiates the value of the picture obtained through normal exposure, depending on the length of contact between the second film and the intensifying screens. In this case the developed film gives the appearance of double exposure that occurs in ordinary photography when two exposures are made accidentally on the same film.

I have found that the sensitivity of X-ray emulsions to this after-glow can be controlled by the use of suitable types of dyestuffs without affecting the sensitivity to the primary glow of the intensifying screen. The dyestuffs that I have found especially valuable for this purpose generally belong to the tri-phenyl-methane series although I do not limit myself to this group. Among the preferred dyes that I have found to be particularly effective in embodying this invention are Pontacyl Fast Violet 10B, Crystal Violet, National Amaranth, National Azure, and National Nocturne.

These dyes are classified according to the Colour Index of the Society of Dyers and Colourists, Bradford, Yorkshire, England, 1st edition January, 1924 as follows:

|  | Index No. | Class |
|---|---|---|
| Pontacyl Fast Violet 10B | 696 | Triphenyl methane. |
| Crystal Violet | 681 | Do. |
| Pontacyl Brilliant Blue A | 714 | Do. |
| Chicago Blue 4R | 391 | Dis-azo |
| Pontamine Fast Blue L | Page No. 363 | Azo direct dye |

National Amaranth, National Azure and National Nocturne are well known dyes manufactured by the National Aniline Company, and are listed in their catalogs. National Amaranth is a mixture of National Fast Acid Blue LB and National Alizarine Violet NR; National Azure is a mixture of National Fast Acid Blue LB and National Acid Green L, and National Nocturne is the equivalent of National Fast Acid Blue LB.

I have determined the light characteristics of the primary-glow and the after-glow of various types of intensifying screens, and found that these characteristics differ to the extent that I have found it possible to control the sensitivity of the emulsion to the predominant light characteristics of the after-glow without reducing the sensitivity of the emulsion to the light characteristics of the primary-glow, by the addition to the emulsion of any suitable types of dyes preferably those corresponding to the dyes herein-described.

The dyestuff or mixture of two or more preferred dyes may be added to the emulsion at any point during its manufacture, or mixed with any of the emulsion constituents or incorporated or added just before the emulsion is coated on the support. The dye may also be applied in the top coatings such as the anti-abrasion layers frequently used in X-ray products or it may be distributed between the emulsion layers and the anti-abrasion top layers. The dye is added preferably in an aqueous solution although it may be introduced in the dry state and stirred till dissolved by the relatively large volume of liquid constituting the emulsion or one of its components. The amount of dye to be added also depends upon the characteristics of the phosphorescent screen used, and varies from 15 milligrams to 1.5 grams of dye per kilogram of the dry constituents of the emulsion (gelatin and silver halide).

The following preferred examples do not limit but are illustrative of my invention:

*Example 1.*—To one litre of X-ray emulsion is added 25 cc. of an aqueous solution containing 50 milligrams of Pontacyl Fast Violet 10B. Film coated with this emulsion will be found to be unimpaired by the after-glow of intensifying screens and equally as sensitive to the primary-glow as films coated with the same emulsion without the dye.

*Example 2.*—To one litre of anti-abrasion or top coat solution containing 20 grams of gelatin and 1 gram of chrome alum, is added 30 cc. of an aqueous solution containing 80 milligrams of National Amaranth. X-ray emulsion top-coated with this solution will be found to be unimpaired by the after-glow of intensifying screens and equally as sensitive to the primary-glow as films without the dye in the top coat or anti-abrasion layer.

Modern commercial X-ray film usually comprises a transparent cellulose acetate base coated on both sides with a sub-stratum layer and having a gelatino-silver halide emulsion coating applied to both sides of said sub-strated base. A gelatinous top-coating sometimes referred to as the anti-abrasion coating is applied to the top surface of each of said emulsion coatings. This X-ray film is usually placed between two intensifying screens and enclosed in a cassette prior to exposure. The object to be X-rayed is placed between this cassette and the source of the X-ray and during exposure the X-rays excite both the upper and lower intensifying screens. Therefore in order to effectively practice my invention it is desirable under the above described conditions to add the dyes referred to herein, to both of the emulsion layers, and or, to both of the anti-abrasion top-coatings. The dyes may also be added as a separate layer or may be added to the sub-stratum layers, as they will diffuse either upwardly or downwardly into the emulsion layer. The dyes used may be of the type that will be dissolved out in subsequent developing and processing treatments, but it is not essential for the efficient operation of this invention that only soluble dyes be employed.

As many apparent and widely different embodiments of this invention may be made without departing from the spirit thereof, it is to be understood that I do not limit myself to the foregoing examples or description except as indicated in the following claims.

I claim:

1. Method of manufacturing an unexposed X-ray gelatine-silver-halide emulsion having an unreduced sensitivity to X-rays and to ordinary light and primary-glow rays of intensifying screens whereby said emulsion is unimpaired by after-glow rays of said screens, that includes the step of incorporating in said emulsion approximately 15 milligrams to approximately 1.5 grams of dye per kilogram gelatin and silver halide therein, said dye being chosen from the group consisting of Pontacyl Fast Violet 10B, Crystal Violet, National Amaranth, National Azure, and National Nocturne.

2. An unexposed X-ray sensitive element comprising an emulsion having an unreduced sensitivity to X-rays and to ordinary light and primary-glow rays of intensifying screens, and unimpaired by afterglow rays of said screens, said emulsion having incorporated therein approximately 15 milligrams to approximately 1.5 grams of dye per kilogram of the dry constituents of said emulsion, said dye being chosen from the group consisting of Pontacyl Fast Violet 10B, Crytsal Violet, National Amaranth, National Azure, and National Nocturne.

WALTER DEWEY BALDSIEFEN.